Patented Dec. 8, 1936

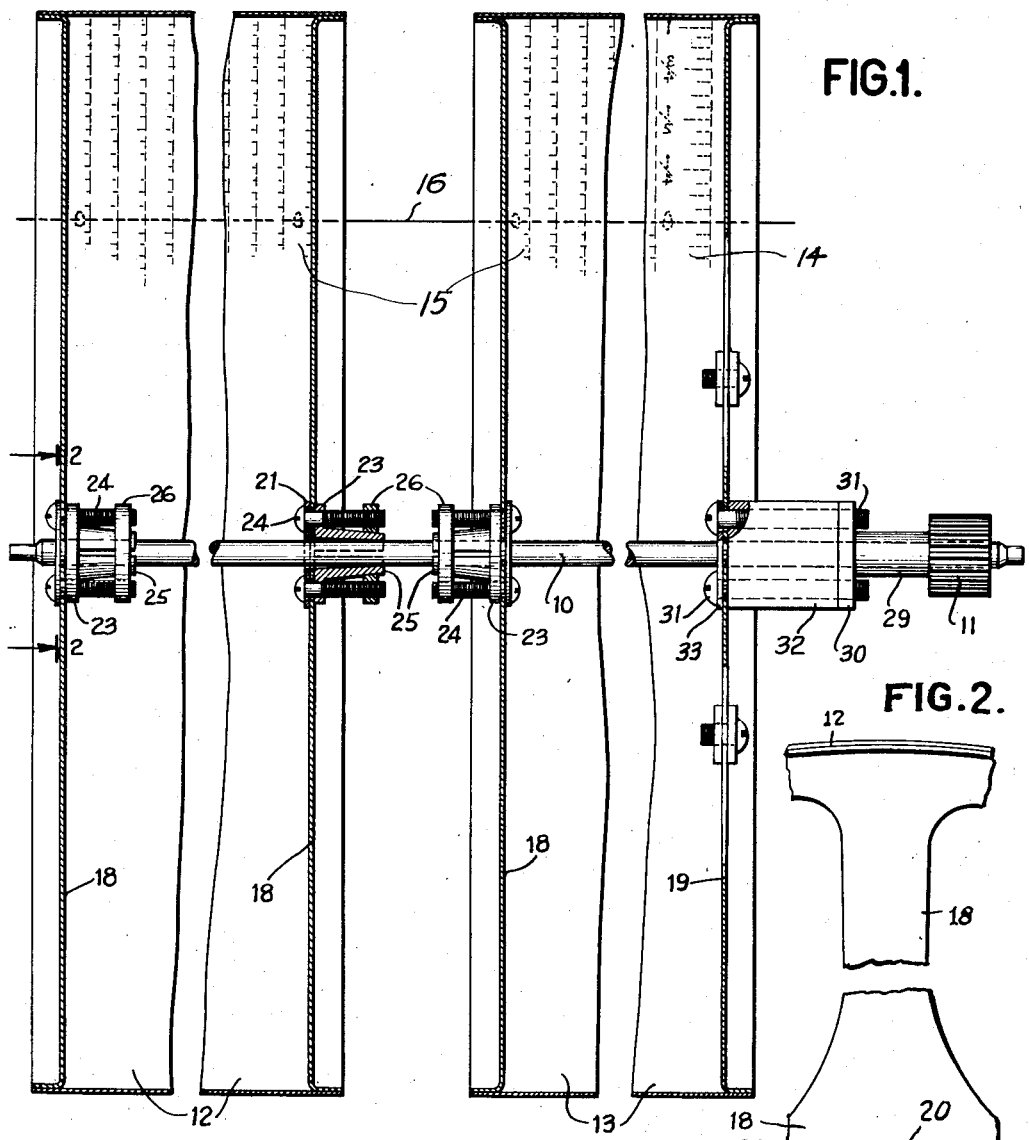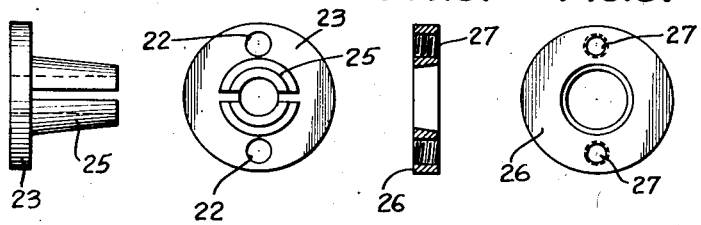

2,063,715

UNITED STATES PATENT OFFICE 2,063,715

CHART ASSEMBLY

Raymond D. Wiley, Dayton, Ohio, assignor, by mesne assignments, to The Hobart Manufacturing Company, Troy, Ohio, a corporation of Ohio Application June 6, 1934, Serial No. 729,263

6 Claims. (Cl. 116—129)

This case relates to means for securing a drum chart, particularly of a weighing scale, to its shaft.

In weighing scales, the load counterbalance, whether spring or pendulum, and the chart have definitely related positions at each particular load. Therefore, the zero position of the chart must be at the reading line when the counterbalance is in initial position. Further, in such computing and weighing scales as are provided with a split drum chart, the two halves of the chart must be adjusted into perfect alinement; i. e., their corresponding zero readings must be in alinement at zero load.

The object of this invention is accordingly to provide means for mounting a drum chart on a shaft which will permit an accurate rotational adjustment of the chart relative to the shaft, particularly to adjust the corresponding weight positions of the two parts of a split drum chart in accurate alinement.

Other objects will be apparent from the following parts of the specification and from the drawing, wherein:

Fig. 1 is a section through a split drum chart;

Fig. 2 is a section on line 2—2 of Fig. 1;

Fig. 3 is a detail of the split hub of a chart, showing the hub in end view;

Fig. 4 is a front view of the detail shown in Fig. 3;

Fig. 5 is an end sectional view through the locking collar which fits over the split hub; and Fig. 6 is a front view of the collar shown in Fig. 5.

The invention may be applied, for example, to the scale disclosed in Patent No. 1,815,995.

The shaft 10 is provided at one end with a pinion 11 to mesh with a rack (not shown) operated by the weighing means according to the applied weight. The split indicator comprises two cylinder chart elements 12 and 13 having weight and price columns 14 and 15, respectively, with each price column based on a different rate or value per unit weight. The weight and value columns are read against the linear index 16. As shaft 10 carries both chart elements, the graduations on each element corresponding to the same weight must be alined with each other and with the index. Further, each chart section must rotate truly concentric to the shaft. The following description is of the means for securing the chart elements 12 and 13 to shaft 10 in a manner to provide for concentricity of the chart sections and for a fine adjustment of the elements on the chart to aline the corresponding weight graduations of the elements with each other. The test of the alinement is that the row of zeros on one chart element be in line with the index at the same time they are in alinement with the zeros of the other chart element.

Chart element 12 is supported by two end spiders or webs 18 while chart element 13 is supported by one spider 18 and a web or spider 19. The parts 18 and 19 are constructed in any suitable manner of thin material so as to have a plurality of spokes connecting the rim and hub of each, the open spaces between the spokes affording access to the interiorly positioned parts. Passing through holes 20 in the spider 18, and holes 22 in a flange 23 at the other side of the spider are unthreaded portions of screws 24. The screws pass snugly through the holes in the flange 23 but loosely through the holes 20 in the spider, with sufficient play to permit slight relative rotational or radial movement of the spider relative to the shanks of the screws and consequently relative to the flange 23.

The flange is an integral part of a split hub collar 25 which embraces the shaft 10 and is formed with a periphery tapered longitudinally of the shaft so that the hubs resemble truncated cones. Embracing the conical periphery of the hub is a ring 26 having its internal bore tapered similarly to the inclined periphery of the hub 25. The ring 26 is provided with threaded holes 27 into which the screws 24 are threaded.

The chart elements and spiders are first assembled with the washer, hub 25, and ring 26 which are all held together loosely by screws 24. The chart elements are then slid onto the shaft 10 to desired longitudinal position and rotated to roughly position them concentrically of the shaft and to aline their zero positions with index line 16. Now the operator applies the screw driver to the screws 24 and while pressing the screws in a direction to maintain their heads firmly engaged with the washers 21, turns the screws in a direction to draw up the rings 26 tightly on the hubs 25. This results in the rings wedging the split hub portions inwardly to firmly and rigidly clamp the hubs to shaft 10. When this has been done, the rings are retained securely in position by friction with the hub and by the constant tendency of the split hub portions to spring apart. The operator may now turn the screws in a direction to loosen the clamping pressure of washer 21 and flange 23 on the spider 18, the screws moving longitudinally outwardly from rings 26 inasmuch as the latter remain fixed in position, as above explained. Spider 18 is then rockably adjusted within the limits allowed by the play between screws 24 and holes 20 of the spider to finely and accurately aline the zero position of the chart element with the index 16, the spider being also radially adjusted to bring the chart periphery into concentricity with the shaft 10.

Screws 24 are then again turned in a direction to cause the washers 21 to firmly clamp the spider against flange 23 to thereby retain the chart elements in finally adjusted position.

Spider 19 is clamped to the shaft in the following manner. The pinion 11 is formed with a sleeve 29 shrunk on the shaft 10 and thereby rigidly fixed to the shaft. One end of the sleeve is formed with a flange 30 having tapped holes to threadedly receive screws 31 which pass freely though snugly through holes in the hub 32, loosely through holes in the spider 19, and through alined holes in washer 33. The screws 31 are tightened up after the chart has been rockably and radially adjusted within the limits permitted by play of screws 31 in the holes of spider 19.

The means described above for assembling the chart sections to shaft 10 does not mar the shaft as no set screws or the like are needed to fit the hubs to the shaft. The chart sections may also be removed without marring the chart and replaced by new sections.

While the invention has been described in connection with the illustrated embodiment, it is understood that changes or modifications within the field of mechanical skill are considered as embraced by the present invention; I therefore wish to be limited only by the following claims.

I claim:

1. In combination, a graduated chart, a web supporting the chart, a shaft, and means for mounting the web on the shaft including a hub on the shaft having a peripheral portion tapered longitudinally of the shaft, a ring embracing the hub and having an internal taper coacting with the taper of the hub, and securing elements connecting the web and the ring and adjustable to shift the ring longitudinally of the shaft to cause the interengaging tapers of the ring and hub to lock the ring and hub to each other and to thereby lock the web and chart to said hub.

2. In combination, a graduated chart, a web supporting the chart, a shaft, and means for rigidly mounting the web on the shaft including a split hub on the shaft, a ring embracing the hub and wedgingly interengaged with the periphery of the hub, and elements substantially non-rotatably connecting the web to the ring adjustable to shift the ring longitudinally of the hub to cause the wedging interengagement between the hub and ring to force the split portions of the hub inwardly towards the shaft to thereby lock the hub rigidly to the shaft and simultaneously lock the ring to the hub to thereby secure the web substantially against rotation relative to the hub and shaft.

3. In combination, a graduated chart, a shaft therefor, and means for rigidly securing the chart to the shaft comprising a web carrying the chart, a split hub on the shaft having a taper extending longitudinally of the shaft, a ring embracing the hub and having an internal taper to fit the taper of the hub, and a plurality of screws passing through the web and threaded into said ring for substantially non-rotatably connecting the ring and the web, said screws being adjustable to move the ring longitudinally of the shaft to cause the interengaging tapers of the collar and the hub to force the split portions of the hub towards each other to firmly clamp the hub to the shaft.

4. In combination, a graduated chart, a shaft therefor, and means for mounting the chart on the shaft comprising a web rigidly carrying the chart, a hub on the shaft having its periphery tapered longitudinally of the shaft, a ring embracing the tapered periphery of the hub, and a plurality of screws substantially non-rotatably connecting the web to the ring and adjustable to shift the ring longitudinally of the tapered periphery of the hub to wedge the ring tightly on the hub and thereby lock it to the hub.

5. In combination, a graduated chart, a web supporting the chart, a shaft, and means for mounting the web on the shaft including a hub member slidable on the shaft, clamping means movable to fixedly position the hub member on the shaft, and a screw member engaging the chart web, the hub member and the clamping means, said screw member upon being tightened fixedly positioning the chart web with respect to the hub member and moving the clamping means to fixedly position the hub member on the shaft.

6. In combination, a graduated chart, a web supporting the chart, a shaft, and means for mounting the web on the shaft including a hub member slidable on the shaft and adapted to be held thereon in gripping engagement, a clamping member axially movable on the hub member to fixedly position the hub member on the shaft, and screw means extending through the chart web and securing it and the clamping member to the hub member, said screw means upon initial tightening serving to move the clamping member to clamping position on the hub member to thus maintain the hub member in fixed position on the shaft even upon subsequent loosening of the screw for release of the chart web to afford chart adjustment with respect to the fixed hub, said screw functioning upon final tightening to fixedly hold the chart web to the fixedly positioned hub member.

RAYMOND D. WILEY.